M. T. SEYMOUR.
ELECTRIC COFFEE AND PEANUT ROASTER.
APPLICATION FILED FEB. 15, 1919.
1,334,876.
Patented Mar. 23, 1920.
2 SHEETS—SHEET 1.
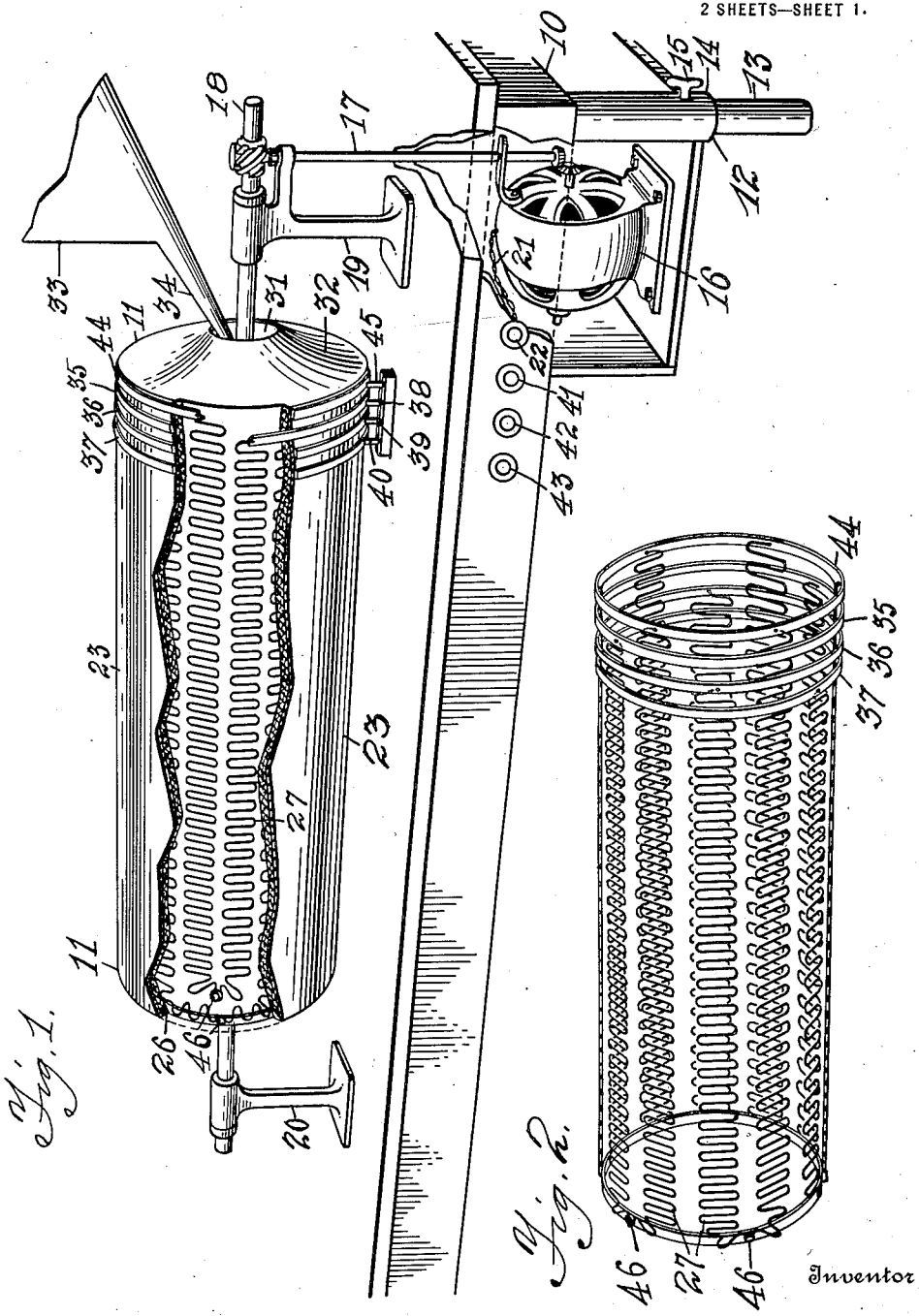

M. T. SEYMOUR.
ELECTRIC COFFEE AND PEANUT ROASTER.
APPLICATION FILED FEB. 15, 1919.
1,334,876.
Patented Mar. 23, 1920.
2 SHEETS—SHEET 2.
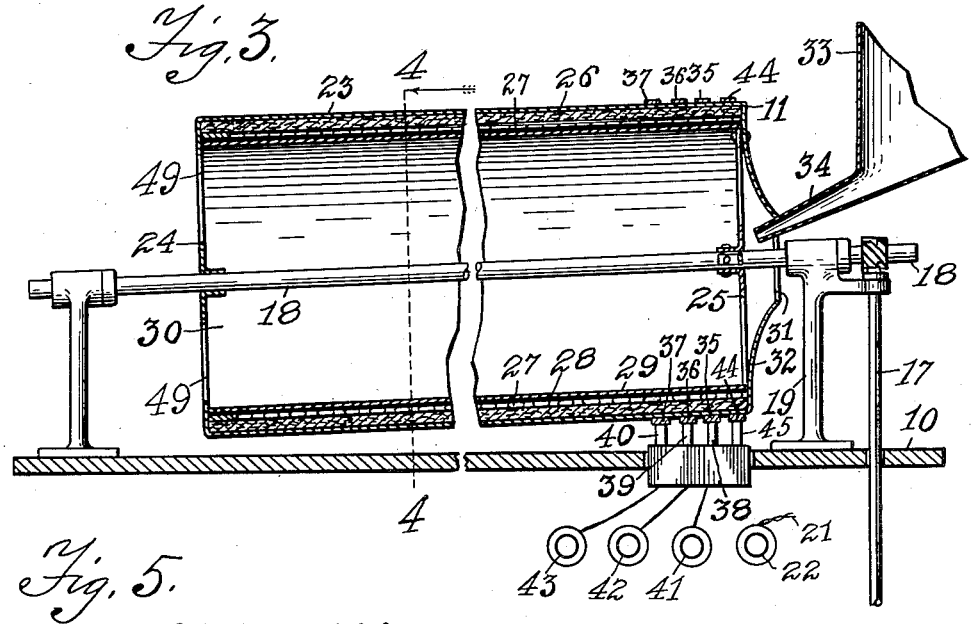
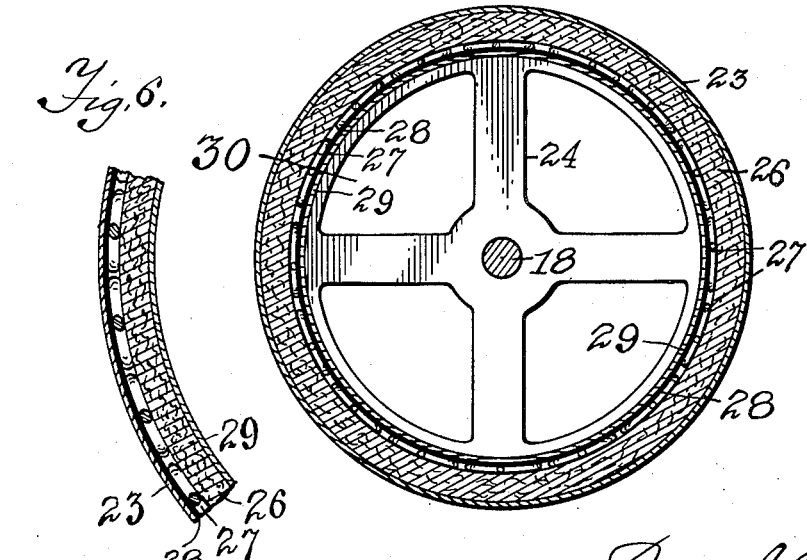

UNITED STATES PATENT OFFICE.

MARK T. SEYMOUR, OF STOWE, NEW YORK.

ELECTRIC COFFEE AND PEANUT ROASTER.

1,334,876.

Specification of Letters Patent.  Patented Mar. 23, 1920.

Application filed February 15, 1919. Serial No. 277,155.

*To all whom it may concern:*

Be it known that I, MARK T. SEYMOUR, a citizen of the United States, residing at the village of Stowe, in the county of Chautauqua and State of New York, have invented certain new and useful Improvements in Electric Coffee and Peanut Roasters, of which the following, taken in connection with the accompanying drawings, is a specification.

The invention relates to roasters for peanuts, coffee, popcorn and similar articles, for which it is desired to provide a uniform, easily controlled heat, which may be safely used in confined spaces, as for example, waiting rooms, passageways and the like; and the improvement consists in providing electrical means for giving any degree desirable of heat, the spaced electrical heating wires being arranged in flat zigzag resistance adjacent to the outer periphery or covering of the roaster in such a manner as to surround and confine the heat within a roasting chamber of large capacity in comparison to the size of the roasting cylinder; and the invention consists in the combination and arrangement of the parts as described in this specification and shown in the accompanying drawings and pointed out in the claims.

In the drawings Figure 1 is a perspective view of the invention, showing the cylindrical outer casing or covering broken away to show the arrangement of the heating wires in their flat zigzag parallel relation to one another, and the manner of attaching the same; and Fig. 2 is a similar view, showing the zigzag heating wires with the cylindrical covering and supporting shaft removed, showing the manner of connecting the same to the spaced contact bands on the outer side of the cylindrical casing. Fig. 3 is a lengthwise diametral sectional view of the coffee or peanut roaster showing the construction and arrangement of the same and its support upon a suitable table with the brush connection to the contact bands for the flat zigzag heating elements. Fig. 4 is a crosswise sectional view of the roasting cylinder at line 4—4 in Fig. 3, showing the preferred arrangement of the same. Fig. 5 is an elevation of two slightly different designs of the preferred form of flat zigzag resistance, a number of series of which are placed lengthwise of the roasting cylinder in return connections from end to end around the same so as to heat the entire chamber. Fig. 6 is a crosswise sectional view of a portion of the cylinder arranged to throw the heat outward to thereby heat the outer surface of the cylinder.

Like characters of reference refer to corresponding parts in the several views.

The numeral 10 designates the table or support for the electric roaster 11, which table is preferably provided with adjustable legs 12 to give said table and the roaster 11 the proper inclination, telescoping leg parts 13 and 14 being provided with a set screw 15 so that the length of each leg 12 can be quickly and easily adjusted.

A motor 16 is provided on the table 10, which is connected by suitable shaft 17 and gearing to the main supporting shaft 18 of the roaster 11 to rotate the same, standards 19 and 20 being provided with suitable journals on their upper ends for the support of the shaft 18. The motor 16 is connected by wire 21 to a push switch 22 for starting and stopping the motor 16.

The roaster 11 consists of an outer sheet metal cylinder 23, which is supported upon suitable end plates 24 and 25, or where the cylinder 23 is of sufficient length to need internal support in its central portion, an additional plate or plates may be provided which like end plates 24 and 25 are attached to the shaft 18 to rotate therewith. Adjacent to the inner side of the cylinder 23, a fireproof lining 26 is provided, preferably made of asbestos. A series of spaced zigzag lengthwise resistance heating strips or wires 27 are provided adjacent to and fitting within the asbestos lining 26. Within the heating strips 27 a complete insulating covering of sheet mica 28 is provided, which is supported by the inner sheet metal cylinder 29 and the end plates 24 and 25.

The inner sheet metal cylinder 29 provides a large interior chamber 30 in which the coffee, peanuts or popcorn may be roasted. These articles are entered in the chamber 30 through an opening 31 in the cylinder head 32, a suitable hopper 33 being provided for the articles to be roasted having a spout 34 at its lower end which extends through the opening 31. The roaster 11 is given a slight inclination as hereinbefore explained in order that the articles to be roasted will work down toward the lower end as the cylinder rotates. The ends 24 and 25 are left open for the entrance and exit of the articles to be roasted, and also for the exit of the moisture or steam driven from the articles by the heat of the roaster.

The electrical heating wires are preferably arranged as shown in Figs. 1 and 2 and 4, being bent in a series of parallel return bends and extended lengthwise of the roasting cylinder lying flat between the asbestos and mica coverings in spaced relation around said cylinder. The zigzag or return bend heating wires are held in parallel spaced relation by being attached at one end to one of a series of contact bands 35—36—37, which are provided around the outer periphery of the cylinder 23 in spaced relation at one end and are connected to the source of electrical energy by means of contact brushes 38, 39 and 40, which bear against the outer periphery of the contact bands 35, 36 and 37. The brushes 38, 39 and 40 are controlled by the push switch buttons 41, 42 and 43, to which they are connected so that different degrees of heat may be given to the interior chamber 30 by simply pushing the required number of push switch buttons 41, 42 or 43. Each of the electrical heating strips 27 is attached as stated at one end to one of the contact bands 35, 36 or 37, and at the other end to a return or collector band 44, which has a brush contact 45 and suitable return connections thereto to complete the circuits for each of the bands 35, 36 and 37, and the zigzag heating wires connected thereto. The zigzag heating strips 27 are supported in position upon suitable insulating binding posts 46 at the opposite end of the cylinder from said contact bands so that said wires are held firmly in spaced relation without danger of short circuit with adjacent wires and returned collector band 44.

The heating wires are arranged in one plane, that is not coiled and preferably given a parallel return bend 47 as shown in Figs. 1, 2 and 5, though they may be given a sharp bend 48 without departing from my invention. The purpose is to provide a series of flat zigzag resistance wires which will provide the necessary electrical resistance in spaced relation around and lengthwise of the cylindrical roaster 11, giving to all parts of the chamber 30 an equal amount of heat units, yet not taking a large amount of space. Toward this end the heating wires 27 are left flat as shown in Fig. 4 in section so that they may be arranged in series and properly connected in circuit with the contact and collector bands while extending from end to end of the cylindrical roaster.

It is apparent that all that is necessary to operate the roaster is to place the article to be roasted within the hopper 33 and press the push switch 22 to start the motor 21, and the required number of push switches 41, 42 or 43 to give the desired heat within the chamber 30. Thus for example, certain articles, like coffee, require a higher heat than others. The exit or exits 49 for the roasted grains or nuts is preferably arranged at the opposite end of the roasting cylinder 11 from the cylinder head 32. The roasting cylinder 11 is preferably of sufficient length to give the required amount of roasting surface for the coffee, peanuts or other articles so that as the rotation of said cylinder 11 causes the coffee or other article to slowly advance by gravity through the roasting chamber 30, according to the angle of inclination of said cylinder, it will be given the desired amount of heat so that it may be gradually emptied by said rotation from the exit or exits 49 roasted ready for use. This elongated arrangement of the cylinder 11 overcomes the necessity for large diametral capacity in the roasting chamber 30 and permits speeding up the roasting process, thereby giving a much larger capacity to the machine while reducing its cost of manufacture.

It would not, however, depart from my invention to arrange for a partial closure of the exit or exits 49, though such partial closure is not usually found either expedient or necessary, since the moisture which is driven out of the coffee or other articles by the heat must be allowed to pass out freely from the chamber 30, otherwise instead of roasting coffee, peanuts or other articles they would be cooked soft in said moisture or steam.

It is apparent that any desired length can be given to the roasting cylinder 11 and that the heat will be evenly distributed or controlled as desired throughout the length of the roasting chamber 30 by means of the spaced series of heating elements, namely, the zigzag or return bend resistance strips 27 which are attached to the contact bands 38, 39 or 40 in alternating relation so that when, for example, the push switch 41 is pressed thereby connecting the circuits connected to contact band 35, the said circuits being alternatingly arranged with circuits attached to the other bands 36 and 37 will evenly distribute the heat around the cylindrical inner chamber 30. Pressing push switch 42 connects a second series of circuits, and push switch 43 connects the third series or full power according to the construction and arrangement shown and described and which is usually sufficient for most roasting processes.

It is obvious that the series of zigzag resistance strips 27 may be placed adjacent the inner side of the metal cylinder 23 to heat said metal cylinder,—it only being necessary to provide the mica insulation 28 between the strips 27 and the cylinder 23 as shown in Fig. 6, in which case the asbestos layer 26 would be placed within the series of resistance strips 27 to thereby prevent the heat passing inward. It is apparent that this is only a reversal of the insulation and asbestos linings in relation to the series of resistance strips 27, otherwise the arrangement will be substantially the same throughout, and the periphery of the metal cylinder 23 can be used for a clothes mangle or for such other purposes as desired.

I claim as new:

1. An electrically heated cylinder comprising a rotatively mounted cylinder, a series of spaced strips of resistance wire each arranged in spaced alinement within said cylinder and lengthwise of the same, said resistance wire in each of said strips shaped in zigzag flat conformation to form a thin electrical heating element of high resistance, connection for each of said strips of zigzag resistance to a source of electrical energy to heat said cylinder, and suitable insulation and covering for said strips of zigzag resistance on the inner surface of said cylinder to turn said heat inward or outward as desired.

2. An electrical heating cylinder comprising a metal cylinder, a contact band and a collector band on said metal cylinder, separate electrical connection between said bands and a source of electrical energy, a series of spaced strips of zigzag resistance extending lengthwise of said cylinder within the same, said strips attached to said contact band at one end and to said collector band at the other, and suitable insulation and covering for said strips.

3. An electric roaster for coffee and similar articles comprising a rotatively mounted cylinder and means for turning the same, a series of heating wire strips arranged lengthwise of said cylinder around the same in spaced relation to one another, the wire in each of said heating wire strips extending zigzag across the same, and suitable connection for each of said heating wire strips to a source of electrical energy to heat said cylinder.

4. An electric roaster for coffee and similar articles comprising a rotatively mounted cylinder and means for turning the same, a series of resistance wire strips within said cylinder extending lengthwise of the same and around the inner wall of said cylinder in spaced relation to one another, each of said strips arranged with the heating wire extending back and forth across the strip in a cylindrical plane adjacent to the inner wall of said cylinder, insulation and asbestos covering for said strips to form an electrical heating element of high resistance in a thin cylindrical plane around the inner wall of said rotatively mounted cylinder to heat the same, and connection for said heating wire strips in series to a source of electrical energy to provide said heat.

5. An electrical heating element comprising a series of spaced wire resistance strips, each of said strips arranged with the heating wire extending back and forth across the strip in a flat plane to form a thin electrical heating element of a high resistance, and suitable connection for said strips to a source of electrical energy.

6. An electric roaster for coffee and similar articles comprising a rotatively mounted cylinder and means for turning the same, a series of zigzag heating wires arranged lengthwise of said cylinder around the same in spaced relation to one another, suitable connection for each of said heating wires to a source of electrical energy to heat said cylinder, and means for adjusting the angle of inclination of said cylinder.

7. An electric roaster for coffee and similar articles comprising a rotatively mounted cylinder and means for turning the same, resistance arranged in flat zigzag spaced strips extending lengthwise of said cylinder and around the same, a plurality of contact and collector bands around said cylinder connected to said zigzag spaced strips, and electrical brush and switch connection between said bands and a source of electrical energy to control the heat in said cylinder.

8. An electric roaster for coffee and similar articles comprising a rotatively mounted cylinder and means for turning the same, flat zigzag resistance strips lengthwise of said cylinder and arranged in spaced relation around said cylinder, a plurality of contact bands and a collector band around said cylinder, said flat zigzag resistance strips attached in alternate succession to said contact bands at one end and at the other end to said collector band, and electrical brush and switch connection between said bands and a source of electrical energy to control the heat in said cylinder.

9. An electric roaster for coffee and similar articles comprising an outer sheet metal cylinder, a lining of asbestos within said cylinder to hold the heat therein, spaced strips of zigzag resistance placed lengthwise of said cylinder against said asbestos lining around the same, a plurality of contact bands around said sheet metal cylinder connected in alternate succession to said resistance strips, a collector band around said sheet metal cylinder attached to the other end of said resistance strips, said contact and collector bands connected in a controllable electrical circuit with a source of electrical energy to form circuits and heat the interior of said cylinder, an insulation covering around the interior of said cylinder within said resistance strips, a sheet metal cylinder within said insulation covering to hold said parts in position against the outer sheet metal cylinder and forming a cylindrical roasting chamber within said cylinder, a rotatively mounted shaft, said cylinder attached to said shaft to rotate therewith, and means of ingress to said cylinder and egress from said cylinder for the articles to be roasted.

In testimony whereof I have affixed my signature in the presence of two witnesses.

MARK T. SEYMOUR.

Witnesses:
 H. A. SANDBERG,
 C. V. SWANSON.